May 24, 1955 O. J. POUPITCH 2,708,956
BITING TOOTH WASHER AND NUT ASSEMBLY WITH THREAD LOCK
Filed Dec. 5, 1952

INVENTOR.
Ougljesa Jules Poupitch
BY
Moore, Olson, & Trexler
Attys.

United States Patent Office 2,708,956
Patented May 24, 1955

2,708,956

BITING TOOTH WASHER AND NUT ASSEMBLY WITH THREAD LOCK

Ougljesa Jules Poupitch, Itasca, Ill., assignor to Illinois Tool Works, Chicago, Ill., a corporation of Illinois Application December 5, 1952, Serial No. 324,227

5 Claims. (Cl. 151—19)

This invention relates generally to fastener units, and more particularly to fastener units in which a washer is held beneath the clamping surface of a nut and is designed to cause impingement of complementary nut and screw thread convolutions as an incident to tightening the fastener unit against a work surface.

More specifically, the present invention is concerned with a preassembled nut and washer arrangement of the type referred to above, in which the washer is secured against axial separation with respect to the nut by a swaged fin or flange spaced axially from the clamping surface of the nut.

It is a further object of the present invention to provide the aforesaid preassembled nut and washer unit in which the body of the washer is laterally displaced so that when the washer is clamped against a work surface, a locking section of limited cross-section carried by the nut is shifted into impingement with the thread of a complementary screw member.

The present invention also contemplates a fastener unit having the functional and structural characteristics referred to above, in which the washer member is provided with a plurality of external locking teeth.

The foregoing and other objects and advantages will be more apparent from the following detailed description when considered in connection with the accompanying drawings, wherein—

Fig. 1 is a side elevational view shown partly in section of a fastener unit which is representative of one embodiment of the present invention;

Fig. 2 is a view of the underside of the fastener unit of Fig. 1;

Fig. 3 is an enlarged fragmentary sectional view of the lower left hand portion of the fastener unit of Fig. 1, the fastener unit being shown in association with a complementary screw member just prior to tightening the lock washer against a work surface;

Fig. 4 is a view similar to Fig. 3 showing the fastener unit tightened against the work surface with the locking section of the nut firmly impinging the complementary thread convolution of the screw;

Fig. 5 is a fragmentary view, similar to Fig. 2, but showing serrations on the inner marginal portions of the washer.

Referring now to the drawings more in detail, wherein like numerals have been employed to designate similar parts throughout the various views, it will be seen that one embodiment of the invention is incorporated in the fastener unit or preassembled nut and lock washer designated by the numeral 20, Figs. 1 to 4, inclusive. The fastener unit 20 includes a nut member 22 and a lock washer on the underside thereof designated generally by the numeral 24. The clamping side of the nut 20 is provided with an annular groove or recess 26 which is defined along its outer margin by a rigid shoulder or wall 28 and along its inner margin by a wall 30, Figs. 3 and 4. The wall 30 forms the outer periphery of a yieldable locking section 32 of limited cross-sectional area. Hence, if sufficient pressure is exerted against the wall 30, the section 32 will be moved into locking impingement with a complementary thread convolution on a screw member 34.

The lock washer 24 includes an annular body portion 36 which is bowed or laterally deflected, as shown in Figs. 1, 3 and 4. The outer or convex side of the body 26 is designed to engage the clamping surface of a work piece 38, as clearly illustrated in Fig. 4, after the fastener unit has been tightened in position. The opposite margin of the bowed body portions 36 are designed to embrace the yieldable locking portion 32 for ultimate impingement with the annular wall 30. In my preferred embodiment these margins are designed to rotate on the locking section 32 as the nut body is rotated to clamping position on the complemental work piece. From the outer margin of the body 36 extend a plurality of spaced prongs 42, which prongs are warped or twisted so as to present oppositely disposed locking teeth 44 projecting beyond the medial plane of the washer.

After the free margins of the bowed body portions 36 are inserted within the annular recess 26, the lower corner of the locking section 32 is swaged or upset to provide a washer retaining fin or flange 46. Thus, before the fastener unit is tightened against a work piece, the washer 24 is free to rotate with respect to the nut 22 and is secured against axial separation from the nut by the swaged fin 46. As the washer teeth 44 are gripped or tightened between the clamping surface of the nut and the complementary surface of the work piece, Fig. 4, the convex side of the bowed body portions 36 ultimately bear against the work surface. This causes the portions 36 to exert a toggle or strutting effect between the rigid or anchor wall 28 and inwardly shiftable wall 30, and causes the marginal sections 40 to aggressively impinge the wall 30. The locking section 32 being of limited cross-section yields inwardly a sufficient amount to impinge the thread convolution of the complementary screw member 34, thereby securing the screw and nut against relative rotary movement. Simultaneously, the teeth 44 lockingly engage the clamping surface of the nut and the complementary surface of the work piece 38. Each prong provides an effective locking strut extending between the faces of the nut and work. In this manner a triple locking effect is produced, namely, a lock against the clamping surface of the nut, another lock against the clamping surface of the work, and still a further locking effect produced by the impingement of the section 32 against the screw threads.

In Fig. 5 there is shown a slight modification of the washer 24 which is indicated as a lock washer 24a. The inner marginal portions are provided with serrations 40a which impinge against the locking wall section 30.

From the foregoing it will be apparent that the present invention contemplates a fastener unit wherein a relatively small fin or flange swaged outwardly from an annular neck portion serves to retain a washer in position, and the washer in turn serves to establish locking impingement of the neck with a screw member as the fastener unit is tightened against a work surface. By having the washer laterally deflected, the clamping thereof against a work surface makes possible the automatic firm engagement of the locking section of the nut against a screw thread. This invention provides a very simple fastener unit comprised of two parts joined together as one operating unit.

In the accompanying drawings certain specific structural embodiments have been disclosed, and it will be apparent that the invention is broad enough to include such modifications and changes which fall within the scope of the appended claims.

The invention is hereby claimed as follows:

1. A fastener unit, comprising a nut, a radially yieldable annular locking section projecting from a clamping side of the nut and co-axial with a threaded opening in the nut, said nut having an annular generally axially extending shoulder spaced from and encircling said locking section, an annular sheet material lock washer encircling said locking section, said washer having a body section with a mid portion deflected axially outwardly of said clamping face beyond said locking section and shoulder, said body section having peripherally spaced inner marginal portions which are positioned adjacent the periphery of said locking section and peripherally spaced outer marginal portions disposed for engagement with said shoulder, said body section having portions of reduced radial cross section between said spaced inner and outer marginal portions to increase the flexibility thereof, a plurality of locking teeth extending radially outwardly from said reduced cross section portions of said body section and underlying said shoulder, and means swaged outwardly from the free extremity of said locking section for preventing the washer from axially separating from the nut.

2. A fastener unit as claimed in claim 1, wherein serrations are provided along the inner marginal portions of the washer for engaging the outer periphery of said locking section.

3. A fastener unit as claimed in claim 1, wherein the body portion of the washer is generally V-shaped having a vertical extent greater than the height of the locking section and shoulder.

4. A fastener unit comprising a nut member having an annularly disposed locking section of limited cross section projecting from the clamping side thereof, a resilient washer member encircling said locking section, flange means extending outwardly from said locking section for securing said washer member against separation from the nut member whereby to provide a preassembled nut and washer unit, abutment means on the nut member and spaced radially outwardly from the locking section, the inner margin of the washer member being positioned adjacent the outer periphery of said locking section and the other margin of the washer member positioned adjacent said abutment means, the body of the washer member being shaped to provide a strut between the locking section and the abutment means and projecting axially outwardly of the clamping side of the nut member, said washer member having circumferentially spaced inner marginal portions and outer marginal portions to simultaneously engage the locking section and the abutment means, respectively, the spaced inner marginal portions being separated from each other by washer portions of reduced radial cross section and the spaced outer marginal portions being separated from each other by washer portions of reduced radial cross section, and locking teeth extending radially from the washer portions of reduced cross section between said outer marginal portions and underlying said abutment means, whereby upon clamping said washer member between the nut member and a work piece the washer marginal portions are flexed to deform the locking section inwardly and whereby the locking teeth bite into the clamping side of the nut member and the work piece.

5. A fastener unit as claimed in claim 4, wherein the inner and outer marginal portions of the washer member are radially aligned, and wherein additional outer marginal portions are provided on the washer member between said locking teeth to also engage said abutment means.

References Cited in the file of this patent

UNITED STATES PATENTS

| | | |
|---|---|---|
| 1,384,019 | Johnston | July 5, 1921 |
| 1,944,595 | Crowther | Jan. 23, 1934 |
| 2,576,890 | Poupitch | Nov. 27, 1951 |
| 2,576,906 | Poupitch | Nov. 27, 1951 |